United States Patent [19]
Jackson

[11] 3,900,287
[45] Aug. 19, 1975

[54] EXHAUST DISPERSE DYEING OF SYNTHETIC POLYMERS UTILIZING A SATURATED LIQUID FLUOROCARBON

[75] Inventor: Harold Leonard Jackson, Hockessin, Del.

[73] Assignee: E. I. Du Pont de Nemours and Company, Wilmington, Del.

[22] Filed: Jan. 9, 1973

[21] Appl. No.: 322,127

[52] U.S. Cl. .............................. 8/174; 8/176; 8/94
[51] Int. Cl. .............................................. D06p 1/90
[58] Field of Search .......................... 8/94, 173–176, 8/162 A

[56] References Cited
UNITED STATES PATENTS

| | | | |
|---|---|---|---|
| 3,617,211 | 11/1971 | Dawson | 8/94 X |
| 3,650,663 | 3/1972 | Barwick, III et al. | 8/179 X |
| 3,692,464 | 9/1972 | Furness | 8/176 X |
| 3,738,803 | 6/1973 | Blanc et al. | 8/174 X |
| 3,762,872 | 10/1973 | Acree | 8/174 X |
| 3,768,968 | 10/1973 | van der Eltz et al. | 8/176 X |

*Primary Examiner*—Benjamin R. Padgett
*Assistant Examiner*—P. A. Nelson

[57] ABSTRACT

An exhaust dyeing process wherein disperse dyes, including water insoluble brightening agents, are applied to and fixed in disperse dyeable synthetic polymers, in the form of films, fibers or fabrics, said process comprising the steps:

a. dissolving an organic disperse dye in a suitable organic solvent to form a dye solution, the organic solvent having a boiling point, either itself or as an azeotrope with the liquid fluorocarbon defined in (b), less than the boiling point of said liquid fluorocarbon;

b. forming a solution or emulsion of the dye solution in a saturated liquid fluorocarbon having a fluorine to carbon atom ratio of at least one, a solubility parameter of less than 7.0 and a critical temperature of at least 135°C.;

c. contacting the disperse dyeable synthetic polymer with the solution or emulsion; and d. heating to evaporate the organic solvent, and then continuing heating at a temperature greater than the glass transition temperature of the synthetic polymer to effect exhaustion of the dye from the solution or emulsion.

11 Claims, No Drawings

EXHAUST DISPERSE DYEING OF SYNTHETIC POLYMERS UTILIZING A SATURATED LIQUID FLUOROCARBON

BACKGROUND OF THE INVENTION

1. Field of the Invention

This invention relates to the exhaust dyeing of synthetic polymers with disperse dyes.

2. Description of the Prior Art

There is a recognized advantage in exhaust dyeing synthetic fibers with disperse dyes in nonaqueous systems, namely, the energy requirements of such processes are lower, due to the lower specific heats and heats of vaporization of organic solvents, than those of processes which employ water. It also is recognized, however, that exhaust dyeing from organic solvents carries with it certain inherent limitations. For example, the degree of dyeing in exhaust procedures depends on the partition function of the dye between the dyeing medium and the fiber. In aqueous systems this function favors the fiber because of the low solubility of disperse dyes in water. In conventional organic solvent systems, the favorable partition function of aqueous systems is often either lost or decreased because the dye tends to be considerably more soluble in the organic solvent than in water. Gebert in Melliand Textilberichte, 52 (6), 710–715 (1971) discloses that for dyeing from perchloroethylene the dye must have low solubility in the solvent. German published application No. 2,002,286 discloses the use of certain halogenated methanes or ethanes having poor dye solvent properties, such as 1,1,2-trichloro-1,2,2-trifluoroethane, monofluorotrichloromethane or 1,2-dichloro-1,1,2,2-tetrafluoroethane. However, in carrying out processes wherein the dyes are relatively insoluble in the halogenated compounds, only dilute solutions of dyes can be obtained and rather large dyebaths must be used to achieve the desired degree of dyeing. German published application No. 1,964,592 discloses the use of a dyeing medium which is a mixture of a base solvent, which is a relatively poor solvent for the dye, such as perchloroethylene, trichloromethane or 1,1,2-trichloro-1,2,2-trifluoroethane, and a secondary solvent, which has a larger dielectric constant and is a better solvent for the dye. Employing such media more concentrated dyebaths can be obtained. Typical secondary solvents include alkanols, alkoxyalkanols, esters, nitroalkanes, alkyl orthoformates, nitriles and ethers. The additional solvent, or its azeotrope with the base solvent, must have a lower boiling point than the base solvent. During the dyeing process, the dyebath is heated, causing the additional solvent to distill from the bath; the distribution function shifts toward the fiber as the additional solvent is removed, and improved dye exhaust is obtained.

DETAILED DESCRIPTION OF THE INVENTION

The present invention resides in an exhaust dyeing process wherein disperse dyes are applied to and fixed in disperse dyeable synthetic polymers, in the form of films, fibers or fabrics, said process providing a high degree of exhaust and fixation. The process comprises the steps of:

a. dissolving an organic disperse dye in a suitable organic solvent to form a dye solution, the organic solvent having a boiling point, either itself or as an azeotrope with the liquid fluorocarbon defined in (b), less than the boiling point of said liquid fluorocarbon;

b. forming a solution or emulsion of the dye solution in a saturated liquid fluorocarbon having a fluorine to carbon atom ratio of at least one, a solubility parameter of less than 7.0 and a critical temperature of at least 135°C.;

c. contacting the disperse dyeable synthetic polymer with the solution or emulsion; and d. heating to evaporate the organic solvent, and then continuing heating at a temperature greater than the glass transition temperature of the synthetic polymer to effect exhaustion of the dye from the solution or emulsion.

Preferred embodiments of the invention include the above process wherein the solution or emulsion of the dye solution is obtained by admixing the dye solution and a preformed solution or emulsion of organic solvent in liquid fluorocarbon, or by dissolving the dye in the preformed solution or emulsion; wherein the dye solution and the liquid fluorocarbon form a solution upon admixing; wherein the dye solution forms an emulsion in the liquid fluorocarbon and there is present in the emulsion a suitable emulsifying agent, for example, $F[CF(CF_3)CF_2O]_9CF(CF_3)CO_2CH_2CH_2[OCH_2CH_2]6\text{-}OCH_3$; wherein the organic solvent is methylene chloride and the liquid fluorocarbon is $F[CF(CF_3)CF_2O]_3CHFCF_3$; and wherein the disperse dyeable synthetic polymer is polyethylene terephthalate and heating is carried out at a temperature of at least 125°C.

The process is useful with any synthetic polymer normally dyeable by disperse dyes, for example, polyesters, polyamides, cellulose acetate, cellulose triacetate, and the like; it is also useful with certain acrylic polymers. It is particularly useful with polyesters, such as polyethylene terephthalate. It can also be used to dye such synthetic polymers which are blended with a second component, such as cotton, wool, and the like, for example, blend fabrics of such materials, without effecting dyeing of the second component. The process can be used to dye synthetic polymers in any dyeable form but it is generally employed with such polymers in the form of fabrics, fibers or films. The process can be divided into two parts, preparation of the dyebath and the actual dyeing. Preparation of the dyebath can be carried out in several ways. In one way, the disperse dye (one or more dyes can be used) is dissolved in an organic solvent which will be described hereafter and the resulting solution is then dissolved or emulsified in a saturated liquid fluorocarbon which also will be described hereafter. In another way, the organic solvent is dissolved or emulsified in the liquid fluorocarbon and the dye is dissolved in the resulting mixture, or the dye is dissolved in the organic solvent and the resulting solution is admixed with the solvent/fluorocarbon solution or emulsion. In general, it is more efficient, and hence preferable, to first dissolve the dye in the organic solvent and then add the dye solution to the liquid fluorocarbon to form a solution or emulsion (also referred to herein as a dispersion).

The disperse dyeable synthetic polymer is introduced into the dyebath and the bath is heated to above the glass transition temperature (Tg) of the polymer. If the organic solvent boiling point is no greater than the Tg, heating will cause the solvent to distill; after removal of the solvent heating is continued until the Tg is exceeded. If the solvent boiling point is above the Tg, the bath is heated until the solvent is removed; it need not be heated to a higher temperature thereafter. When dyeing is completed, the synthetic polymer is scoured and/or rinsed with the same liquid fluorocarbon which was used in the dyebath, with a different liquid fluorocarbon, or with some other liquid, to remove excess dye and dyebath liquor, and then dried.

Disperse dyes are a well known group of organic dyes having the common property of being free of solubilizing ionic groups. Solubilizing, as the term is used here, refers to solubilizing in water, not in organic solvents. Disperse dyes are derived from all of the major known chromophoric color systems. The majority of commercially available disperse dyestuffs are derived from azo, anthraquinone, quinophthalone, oxazine, stilbene, benzothioxanthene or benzoxanthene systems; other types of disperse dyes are also well known, for example, metallized disperse dyes. Disperse dyes are distinguished from organic pigments in that the former are usually soluble in common organic solvents, such as those described hereinafter, whereas the latter are not. The present invention is not limited to any particular type of disperse dye. Any known disperse dye which can be used to dye the aforementioned synthetic polymers by aqueous procedures can be used in the present procedure. Water insoluble brightening agents are considered to be disperse dyes herein and are useful in the process of the invention.

The liquid fluorocarbons which are used in the present procedure must meet three requirements. They must have fluorine to carbon atom ratios of at least 1, that is, there must be at least as many fluorine atoms as carbon atoms in the molecule. The remaining constituents of the molecule are usually hydrogen atoms, other halogens, particularly chlorine atoms, or hetero-atoms, in particular, ether oxygen or tertiary amine nitrogen atoms. The liquid fluorocarbons must have solubility parameters (as hereinafter defined) of less than 7.0. This is to insure that the dyes are sufficiently insoluble in the liquid fluorocarbon to have partition functions which favor the polymer rather than the liquid. When the solubility parameter is less than 7.0, dye utilization herein exceeds 75% and often approaches 100%. This may be compared to the use of tetrachloroethylene, with a parameter of 9.7, which gives utilizations of less than 25% under the same conditions described herein for the instant process. The liquid fluorocarbons must also have critical temperatures of at least about 135°C. since the dyeing procedure of the invention requires temperatures which may reach 135°C.

There are a number of known, useful liquid fluorocarbons having the aforementioned properties. These include the following, with the solubility parameters being given in parentheses if they have been measured or calculated: perfluoro(dimethylcyclobutane) (5.6), perfluoropentane, perfluorokerosene constituents, such as perfluorotetradecane, perfluoroethers, such as perfluoro(N-propylmorpholine) (6.0), perfluoro(2-butyltetrahydrofuran), perfluoro(2-propyltetrahydropyran) and the hexafluoropropylene oxide polymers F[CF(CF$_3$)CF$_2$O]$_n$CHFCF$_3$ (5.5–6.5), $n$ being an integer preferably at least 3, and F[CF(CF$_3$)CF$_2$O]$_m$CF$_2$CF$_3$, $m$ being an integer preferably at least 3, having molecular weights as high as several thousand. Also included are chlorofluoroalkanes, such as 1,2-dichloroperfluorocyclobutane (6.5), 2,3-dichloroperfluorobutane (6.5), 2,2- or 2,3-dichloroperfluoropropane (6.3), 1,1,1-trichloroperfluoropropane, 1-chloroperfluorodecane, 1-chloroperfluorododecane, and like compounds. The above listing is not intended to be complete. Any fluorocarbon or mixture of fluorocarbons having the required properties is meant to be included. Fluorocarbons which are not useful herein because they have insufficiently high critical temperatures are tetrafluoromethane, chlorotrifluoromethane, dichlorodifluoromethane, chlorodifluoromethane, hexafluoroethane, chloropentafluoroethane and octafluorocyclobutane. In general, unsaturated fluorocarbons are excluded or undesirable because of their reactivities, especially with free amino groups, such as often are present in disperse dyes, and because they often are highly toxic.

The solubility parameter of a liquid fluorocarbon can be calculated from the equation $$\delta = \left[\frac{\Delta H - RT}{V}\right]^{1/2}.$$

where $\delta$ is the solubility parameter, in the units of (cal./cc.)$^{1/2}$, $\Delta H$ is the heat of vaporization per mole, $R$ is the gas constant, $T$ is the absolute temperature and $V$ is the volume per mole, all in consistent units. $\Delta H$, if not already known, is readily determined by standard methods. $V$, if not known, is easily calculated from the density of the compound by dividing it into the molecular weight. Critical temperature, if not known, can be closely estimated by using the empirical formula $T_c = 1.41T_B + 66 - 11F$. $T_c$ is the critical temperature in °K., $T_B$ is the boiling point in °K. at 1 atmosphere of pressure and $F$ is the number of fluorine atoms present in the molecule. $T_B$ can never be greater than $T_c$. The solubility parameter is often known as the Hildebrand solubility parameter. The theory underlying the solubility parameter is that solvents tend to dissolve substances with similar solubility parameters but not substances with widely different solubility parameters. Since disperse dyes have high parameters, the liquid fluorocarbon should have a low parameter. The synthetic polymers which are useful herein also usually have high parameters; hence, the liquid fluorocarbons of low parameters are less likely to attack the polymer.

The choice of organic solvent used in the present process depends on the liquid fluorocarbon and the disperse dye used. The organic solvent must either itself or as an azeotrope with the liquid fluorocarbon have a boiling point less than that of the liquid fluorocarbon. This is necessary so that the solvent can be removed during heating to complete the dye exhaust process from the liquid fluorocarbon. The organic solvent must also dissolve the disperse dye at least to the degree necessary to form a dyebath of the concentration desired. Because disperse dyes vary widely in structure, their solubilities in organic solvents also vary widely. Within the above limitations the types of organic solvents which have been found useful in the present process include alkanols, such as methanol, ethanol, propanol, isopropanol, and t-butanol; haloalkanols, such as 2,2,3,3-tetrafluoropropanol; ketones, such as acetone and methyl ethyl ketone; acids, such as acetic and propionic acids; esters, such as ethyl acetate; amides, such as N,N-dimethylformamide and N,N-dimethylacetamide; nitriles, such as acetonitrile, propionitrile and butyronitrile; hydrocarbons, such as benzene and toluene; nitroalkanes, such as nitromethane and nitroethane; ethers, such as dioxane and tetrahydrofuran; and halohydrocarbons, such as methylene chloride, 1,1,1 -trichloroethane, chloroform, ethylene dichloride, monochlorobenzene, trichloroethylene and perchloroethylene. The foregoing list is not meant to be complete; any organic solvent meeting the previously described requirements can be used. Furthermore, it is not necessary that the organic solvent be soluble in the liquid fluorocarbon.

When the solution of disperse dye in organic solvent is not soluble or is not soluble to the desired degree in the liquid fluorocarbon, the dye solution may be emulsified in the liquid fluorocarbon. When using this variation, it will generally be found desirable to use an emulsifying agent (also referred to herein as a surface active agent or surfactant) to aid in forming and maintaining the emulsion. The surface active agent must have sufficient solubility in the liquid fluorocarbon to function as such. Also, the more useful surface active agents have hydrophile-lipophile balance (HLB) values of less than 4 (See, for example, Schick, "Nonionic Surfactants," Vol. 1, Chapter 18, Dekker, 1967; Becker, "Emulsion Theory & Practice," 2nd Ed., 1965, page 233 et seq.; and Kirk-Othmer, "Encyclopedia of Chemical Technology," 2nd Ed., Vol. 8, page 128 et seq.). Surface active agents, as is well known, occur as two general types, ionic and nonionic. The ionic group is further subdivided into cationic and anionic. Surface active agents containing fluorinated groups are generally preferred in preparing the dye/liquid fluorocarbon emulsions herein, but useful surfactants are not limited to those containing fluorinated groups. Useful well known ionic surfactants include, where $R_f$ is a perfluoroalkyl group, generally of 3-18 carbon atoms, perfluoroalkanecarboxylic acids $R_fCO_2H$ and their salts; perfluoroalkanesulfonic acids $R_fSO_3H$ and their salts; acids containing perfluoroalkyl terminated aliphatic groups, such as $R_fCON(R)—R'—CO_2H$, $R_fSO_2N(R)—R'—CO_2H$, $R_f(CH_2)_nO—R'—SO_3H$, $R_f—R'—CO_2H$, $R_f—R'—SO_3H$, $R_f—R'—S—R'—CO_2H$, $R_f—R'—O—R'—CO_2H$, $R_f—R'—PO(OH)_2$ and $R_f—R'—SO_4H$, where R is H or alkyl, R' is alkylene and n is at least one, generally 1-14. Also included, where $R_f$, R and R' are as above and $R_f'$ is F or $CF_3$, Q is quaternary ammonium, $X^-$ is an anion, n is at least one, generally 1-10, m is generally 2-12 and a is 1 or 2, are the carboxylic acids of structure $F[CF(R_f')CF_2O]_n—CF(R_f')$ $CO_2H$, prepared by polymerization of tetrafluoroethylene oxide or hexafluoropropylene oxide; phosphate esters, such as $[R_f—R'—O]_aP(O)(OH)_{3-a}$; perfluoroalkyl containing quaternary ammonium salts, such as $[R_fCONH(CH_2)_mNR_3]^+X^-$, $[R_fSO_2NH(CH_2)_mNR_3]^+X^-$, $[R_f—R'—SO_2NH(CH_2)_mNR_3]^+X^-$, $[R_fSO_2N(R)—R'—CH_2OCH_2Q]^+X^-$, $[R_f—R'—CONHCH_2Q]^+X^-$, $[R_fCONHCH_2Q]^+X^-$, $[R_f—R'—O—CH_2Q]^+X^-$, $[R_fSO_2N(R)—R'—CONHCH_2Q]^+X^-$, $[R_fO[CF(CF_3)CF_2O]_nCF(CF_3)CONH—R'—NR_3]^+X^-$, $[R_f—CO—N-H—R'—N^+(R)_2—R'—CO_2^-]$, $[R_fCH_2O_3S—CH_2NR_3]^+X^-$, $[R_f—R'—NR_3]^+X^-$ and $[R_f—R'—SO_2NH—R'N^+(R_2)—R'CO_2—]$. This list is not intended to be complete since there are other known ionic fluorinated surfactants which are useful herein.

Useful fluorinated nonionic surfactants include the alkylene oxide adducts of fluorinated alcohols, acids and the like, such as $R_fCH_2CH_2O(CH_2CH_2O)_x—H$, $R_f(CH_2)_nOCH_2CH_2CH_2CO_2(CH_2CH_2O)_x—H$ and $R_fCH_2O(CH_2CH_2)_x—H$, and the alkyl ethers of such adducts, where $R_f$ is a perfluoroalkyl group, usually of 3-18 carbon atoms, n is at least one, generally 1-14, and x generally is 1-20. Again, this list is not intended to be complete.

Some typical but not all inclusive examples of useful nonfluorinated surfactants are the mono and bis phosphate esters of fatty alcohols $(R—O)_aP(O)(OH)_{3-a}$, where a is 1 or 2 and R is $C_{8-14}$ alkyl, and the alkylamine salts $(RO)_aP(O)(OH)_{3-a}NH_2—R''$ where R'' generally is $C_{6-18}$ alkyl, for example, 2-ethylhexyl; lower alkylamine salts of higher alkylbenzenesulfonic acids, a typical example being isopropylammonium dodecylbenzenesulfonate; quaternary ammonium salts made by reacting N,N,N', N'-tetrakis(2-hydroxypropyl)ethylenediamine fatty acid esters with methyl sulfate; typical nonionics such as $RNH(CH_2CH_2O)_{25}H$ where R is $C_{12-22}$ alkyl; the adducts of ethylenediamine and propylene oxide, then ethylene oxide; and silicone surfactants $R'([—Si(R)_2O[_y]_a([C_nH_{2n}O]_xR'')_b$ where y is 2 or 3, n is 2, 3 or 4, x is at least 5, a is 1 or 2, b is 1-6 and R, R' and R'' are hydrocarbon radicals, a typical example being $C_2H_5Si(O[—Si(CH_3)_2O]_z[C_2H_4O]_x[C_3H_6O]_yC_4H_9)_3$ which contains 50% $C_2H_4O$ units and 50% $C_3H_6O$ units, z being 1 or 2 and x + y being at least 5. Not all silicone surfactants are useful.

The preferred surfactant or emulsifying agent for use in this invention is
$F[CF(CF_3)CF_2O]_9CF(CF_3)CO_2CH_2CH_2(OCH_2CH_2)_6OCH_3$, prepared by esterification of the polyether $CH_3O(CH_2CH_2O)_6CH_2CH_2OH$ with $F[CF(CF_3)CF_2O]_9CF(CF_3)CO_2H$. The amount of surfactant required will vary with the liquid fluorocarbon, the organic solvent, the disperse dye and the surfactant itself. For this reason, a certain amount of testing will be required with each specific combination to determine the optimum amounts needed. Typically, however, surfactant concentrations range from 0.2 to 2.0 grams per liter of liquid fluorocarbon.

As indicated above, at least the final heating portion of the present dyeing process must be carried out at a temperature above the glass transition temperature of the synthetic polymer. The glass transition temperature of a synthetic polymer depends not only on the chemical composition and/or type of the polymer but also on the physical state of the polymer. For example, polyethylene terephthalate has a Tg of 67°C. in the amorphous condition, 81°C. in the crystalline condition and 125°C. when crystalline and oriented. Nylon behaves similarly. It is, therefore, preferable to carry out the final stage of the dyeing process at a temperature higher than the highest Tg expectable for the synthetic polymer in question (thus, above 125°C. for polyethylene terephthalate). The synthetic polymer is heated in the dyebath until dye ceases to exhaust from the bath. The optimum time required will vary with the synthetic polymer, the dyebath temperature and the dye itself. As is commonly known in the dyeing art, disperse dyes fall into two classes often known as low energy and high energy dyes, the terms being descriptive of the energy requirements for dye fixation. It should, therefore, be expected that low energy dyes will fix more rapidly and at lower temperatures than high energy dyes and some experimentation will be required to determine optimum dyeing conditions with any particular combination of synthetic polymer and dye. In general, however, dyeings are complete in 1 hour, and very often, in considerably less than 1 hour.

When the desired dyeing temperature is less than the atmospheric pressure boiling point of the liquid fluorocarbon, dyeing can be carried out at atmospheric pressure in an unsealed vessel. Because liquid fluorocarbons tend to be volatile below their boiling points, provision preferably should be made to prevent escape of the vapors of the liquid fluorocarbon. This is desirable not only to prevent contamination of the atmosphere surrounding the dyeing equipment but also to prevent loss of the somewhat expensive liquid fluorocarbon. Commercially available equipment for solvent treating textiles and the like is suitable for carrying out the present process at atmospheric pressure. When the desired dyeing temperature is above the atmospheric pressure boiling point of the liquid fluorocarbon, the dyeing process must be carried out in a pressure vessel. When operating under pressure, provision must be made for removal of the organic solvent during the initial heating stages. The simplest mode of operation usually is to allow the organic solvent to distill off at atmospheric pressure, after which the vessel is sealed and heating is continued to the desired temperature under pressure. If desired the entire operation can be carried out under pressure with a pressure still attached to the dyeing vessel. Equipment is also commercially available for carrying out dyeings under elevated pressures. Care should be exercised to make sure the pressure rating of the equipment used is sufficient to withstand the vapor pressure of the liquid fluorocarbon at the dyeing temperature used. The vapor pressure-temperature relationships of most of the lower boiling liquid fluorocarbons useful in the present process are available in the literature.

In carrying out the present process, it is desirable, and in most cases necessary, to recover the organic solvent as it distills or evaporates from the dyebath. The organic solvents cannot simply be allowed to evaporate into the atmosphere, not only because of the economic penalty involved but also because of the hazards created by so doing. It is then necessary to carry out the process in a vessel equipped to condense and recover the organic solvent as it distills. This is readily accomplished by using a dyeing vessel from which vapors can only escape into a distillation column, total condenser or the like. The choice of particular apparatus depends on how readily the organic solvent is separated from the liquid fluorocarbon by distillation. Easily separable mixtures require only a simple one-plate system with a total condenser. More difficultly separable mixtures may require several theoretical plates with controlled reflux ratios and liquid return lines to the dyebath vessel. Those skilled in the distillation art can readily determine the distillation conditions for any particular combination of organic solvent and liquid fluorocarbon.

A number of azeotropes of organic solvents and liquid fluorocarbons of the types used herein are known in the art. If the organic solvent and liquid fluorocarbon form an azeotrope, and the azeotrope is distilled from the dyebath vessel, sufficient liquid fluorocarbon should be provided initially to the dyebath so that the portion remaining after distilling off the azeotrope will be adequate for carrying out dye exhaustion. The existence of an azeotrope can, of course, be determined beforehand by well known physical means.

The distillatively recovered organic solvent, or its azeotrope with the liquid fluorocarbon, can be recycled to prepare other dyebaths. The recovered liquid fluorocarbon also can be recycled. Thus, except for small accidental losses, the organic solvent and the liquid fluorocarbon consumption in a continuing operation is relatively small.

When the exhaust dyeing is completed, the dyed synthetic polymer is rinsed or scoured with the same liquid fluorocarbon used in the dyebath, with a different liquid fluorocarbon or with some other liquid, to remove excess adhering dyebath liquid and unfixed dye. When the liquid fluorocarbon used in the dyebath has a relatively elevated boiling point at atmospheric pressure, it is generally preferable to carry out the rinsing or scouring with a relatively low boiling liquid fluorocarbon, such as 1,1,2-trichloro-1,2,2-trifluoroethane, or some other low boiling liquid. Removal of a lower boiling liquid from the synthetic polymer in the subsequent drying step is easier, quicker and requires less thermal energy than removal of a higher boiling liquid. If an undesirable amount of high boiling liquid fluorocarbon accumulates in the low boiling rinse liquid, the two may be separated by distillation. After rinsing, the dyed polymer is dried by means well known in the art. Preferably methods include heating or passing warm air through the polymer mass to cause evaporation of retained liquid. In any case, it is usually desirable to recover any evaporated liquid fluorocarbon. This can be accomplished by passing the fluorocarbon vapors over a cold surface, to cause condensation thereof, or by passing them through an adsorbent, such as carbon, to collect the vapors. In the latter case, the adsorbent is subsequently heated and the evolved fluorocarbon is recovered by conventional means.

The exhaust dyeing process of this invention provides a highly efficient and completely nonaqueous system for dyeing synthetic polymer fabrics, fibers and films. It generally avoids the problems and energy requirements of aqueous systems as well as the effects that known solvent dyeing systems have on disperse dyes and synthetic polymers.

EXAMPLE 1

The dyeing vessel comprised a 110 ml. cylindrical glass vessel fitted with a stirrer, thermometer and a short distillation head. A 3.175 cm. × 12.70 cm. (1.0 g.) sample of polyester double-knit fabric was secured around the shaft of the stirrer. A dye solution of 10 mg. of

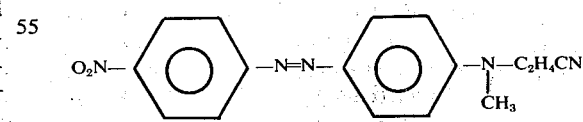

(orange) in 9 ml. of trichloroethylene was prepared and then added to 81 ml. of F[CF(CF$_3$)CF$_2$O]$_3$CHFCF$_3$. With stirring, the solution was heated rapidly to 152°C. (the boiling point of F[CF(CF$_3$)CF$_2$O]$_3$CHFCF$_3$) and then refluxed at this temperature for 10 minutes. During the heating 14.6 ml. of distillate were collected (7.2 ml. of trichloroethylene and 7.4 ml. of a mixture rich in the liquid fluorocarbon). At the end of the heating period the solution was colorless, indicating excellent exhaust. The fabric was strongly dyed.

When the above procedure was repeated twice using in place of trichloroethylene an equal volume of perchloroethylene and an equal volume of dimethyl carbonate, essentially identical results were obtained.

EXAMPLE 2

A dye solution of 10 mg. of the dye of Example 1 in 9 ml. of methylene chloride was prepared. The solution was added, with agitation, to 86 ml. of $F[CF(CF_3)CF_2O]_3CHFCF_3$ containing 80 mg. of the surfactant $F[CF(CF_3)CF_2O]_9CF(CF_3)—CO_2CH_2CH_2(OCH_2CH_2)_6OCH_3$, to form a dispersion. The dispersion was added to the dyeing vessel described in Example 1, with a 1 g. sample of polyester double-knit attahced to the stirrer shaft as in Example 1. After standing for 3 min. at room temperature, the dispersion was heated rapidly to 150°C., during which heating the methylene chloride distilled from the vessel. Heating at 150°C. was continued for 10 min.; the fabric was then washed, by immersing in trichlorotrifluoroethane, and dried. The dyebath was colorless, indicating excellent exhaust; the dyeing was strong, level and crockfast.

When the above procedure was repeated using an equal volume of perfluorokerosene (average composition $C_{14}F_{30}$, b.p. 60°–130°C./10 mm.) in place of $F[CF(CF_3)CF_2O]_3CHFCF_3$, essentially identical results are obtained.

EXAMPLE 3

A Kinetodyeograph [such as described by Schuler, Textile Research Journal, 27, 352 (1957)] was charged with a dispersion prepared from a dye solution of 0.1 g. of the dye of Example 1 in 80 ml. of methylene chloride and 720 ml. of $F[CF(CF_3)CF_2O]_3CHFCF_3$ containing 0.5 g. of the surfactant $F[CF(CF_3)CF_2O]_9CF(CF_3)CO_2CH_2CH_2(OCH_2CH_2)_6OCH_3$. A 25 g. package of polyester textured filament yarn was positioned in the device. The dispersion was pumped through the package for 2 min. and, with continuous pumping, heating was started; the fluorocarbon bath rose at 3.2°C./min. During the heat-up, the methylene chloride distilled. Upon reaching 135°C., this temperature was maintained for 30 min. The resulting yarn package was dyed substantially uniformly throughout.

EXAMPLE 4

A dye dispersion was prepared by dissovling 10 mg. of

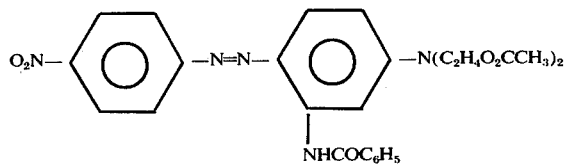

in 5 ml. of monochlorobenzene and adding, with agitation, the resultant solution to 95 ml. of $F[CF(CF_3)CF_2O]_5CHFCF_3$. The dispersion was placed in the apparatus of Example 1 and 1.08 g. of polyester double-knit fabric and 0.155 g. of polyester film were added. Heating was initiated and at 110°C. 3 drops of the surfactant $F[CF(CF_3)CF_2O]_9CF(CF_3)CO_2CH_2CH_2(OCH_2CH_2)_6OCH_3$ and 10 ml. of monochlorobenzene were added. Heating was continued until the temperature reached 202°C. The distillate which was collect consisted of a two phase system (12.8 ml. top layer, 3.0 ml. lower layer). Heating was continued at 202°–203°C. for 30 min. The fabric and film were then removed, washed by immersion in trichlorotrifluoroethane, scoured with acetone at room temperature and dried. Both the fabric and film dyeings were strong and level.

EXAMPLE 5

A dye solution of 2 mg. of

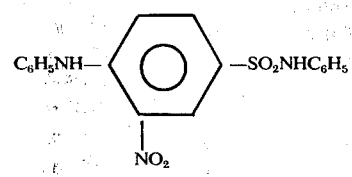

in 1 ml. of N,N-dimethylformamide was prepared and added to 9 ml. of perfluorokerosene (described in Example 2). The mixture was placed in the apparatus of Example 1 along with 0.21 g. of polyester double-knit fabric. The mixture was heated, with agitation, to 180°C.; during the heating period 0.7 ml. of distillate was collected. Heating was continued at 180°C. for 15 min. The fabric was then washed by immersing in trichlorotrifluoroethane, scoured at room temperature with acetone and dried. A strong green-yellow dyeing was obtained.

EXAMPLE 6

Example 5 was repeated using 2 mg. of the dye mixture containing

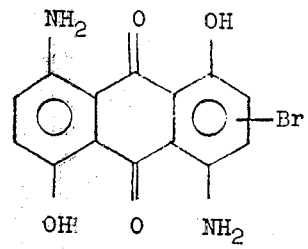

and

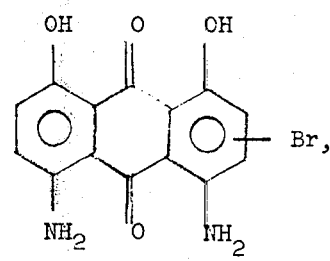

2 ml. of methylene chloride, 8 ml. of perfluoro(tributylamine) and 0.19 g. of polyester double-knit fabric. The bath was heated to 150°C. and maintained at that temperature for 30 min.; the methylene chloride distilled off during the heating. After washing by immersing in trichlorotrifluoroethane, scouring in actone at room temperature and drying, an excellent strong dyeing was obtained.

EXAMPLE 7

This example demonstrates the use of a water insoluble brightening agent, a material which is considered to be a disperse dye in the process of this invention. A solution of 1 mg. of "Uvitex" ER, a commercially available fluorescent brightening agent, in 2 ml. of ethylene dichloride was added to 10 ml. of $F[CF(CF_3)CF_2O]_3CHFCF_3$ containing 1 drop of the surfactant $F[CF(CF_3)CF_2O]_9CF(CF_3)CO_2CH_2CH_2(OCH_2CH_2)_6OCH_3$. The dispersion and 0.2 g. of polyester double-knit fabric were placed in the apparatus of Example 1 and heated to 129°C. A total of 2.0 ml. of distillate was collected in two phases of 1.4 ml. and 0.6 ml. The bath was held at 130°C. for 30 min. The fabric was then washed by immersing in trichlorotrifluoroethane, scoured at room temperature with acetone and dried. The fabric was whiter and brighter than untreated fabric and it fluoresced strongly under ultraviolet light.

EXAMPLE 8

A dye solution was prepared from 5.1 mg. of the dye of Example 6, 8 ml. of methylene chloride and 4 ml. of methanol. The solution was dispersed in 90 ml. of $F[CF(CF_3)CF_2O]_yCHFCF_3$, $y$ being 6.5 average, containing 2 drops of the surfactant $F[CF(CF_3)CF_2O]_9CF(CF_3)CO_2CH_2CH_2(OCH_2CH_2)_6OCH_3$. The dispersion and 1.42 g. of a multifilament test fabric were placed in the apparatus of Example 1 and heated to 130°C.; 7.8 ml. of distillate was collected. Heating at 130°C. was continued for 1 hours. After washing by immersing in trichlorotrifluoroethane, the fabric was scoured at 95°C. with aqueous "Duponol" RA (2 g./l.), a commercially available sodium alkyl ether sulfate surface active agent, then water and dried. It was found that the acetate and triacetate fibers of the fabric were partially dissolved; the "Dacron" T54 polyester, "Dacron" T64 polyester, nylon 66 and "Verel" A acrylic portions were strongly dyed; the other acrylic, cotton, silk, wool and viscose portions were at most stained or tinted.

EXAMPLE 9

A dye solution was prepared from 9 ml. of dioxane, 3 ml. of water and 5.0 mg. of

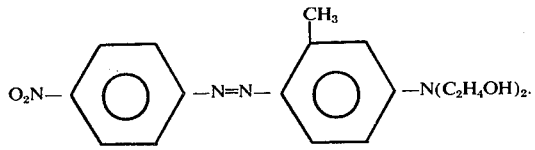

The solution was added to 90 ml. of $F[CF(CF_3)CF_2O]_3CHFCF_3$ containing 2 drops of the surfactant $F[CF(CF_3)CF_2O]_9CF(CF_3)CO_2CH_2CH_2(OCH_2CH_2)_6OCH_3$ in the apparatus of Example 1. Multifilament test fabric (1.48 g.) was heated in the dye dispersion, with agitation, to 150°C.; during the heating period 9 ml. of dioxane rich distillate and 10.9 ml. of fluorocarbon rich distillate was collected. Heating at 150°C was continued for 1 hour. The dyed fabric was treated as in Example 8. Acetate, triacetate and "Dacron" 64 polyester portions were strongly dyed; "Creslan" 61, "Dacron" 54 polyester, nylon 66, silk, "Verel" A acrylic and wool portions were moderately dyed; "Acrilan" 1656 acrylic, cotton, "Orlon" 75 acrylic, and viscose portions were either not dyed or were only stained.

EXAMPLE 10

A dye solution was prepared from 9.3 g. of chloroform, 0.7 g. of ethanol and 5.0 mg. of 1-amino-2-phenoxy-4-hydroxyanthraquinone. The solution was added to 90 ml. of $F[CF(CF_3)CF_2O]_3CHFCF_3$ containing 2 drops of the surfactant $F[CF(CF_3)CF_2O]_9CF(CF_3)CO_2CH_2CH_2(OCH_2CH_2)_6OCH_3$ in the apparatus of Example 1. Multifilament test fabric (1.49 g.) was heated in the dispersion, with agitation, to 130°C.; during the heating period 10.3 ml. distillate were collected. After treating the fabric as in Example 8 it was found that the acetate, triacetate, polyester and "Verel" A acrylic portions were strongly dyed; the nylon 66 portion was moderately dyed; the cotton, wool, "Orlon" 75 acrylic, silk and viscose portions were only stained.

EXAMPLE 11

A dye solution of 4.0 mg. of 2,3-dichloro-1,4-diaminoanthraquinone in 4 ml. of methyl ethyl ketone was prepared and added to 20 ml. of "Rimar" 101 [a mixture of 30–35% of perfluoro(2-n-butyltetrahydrofuran), 55–60% of perfluoro(2-n-propyltetrahydropyran) and 5–15% of unidentified perfluoro compounds] containing 2 drops of the surfactant $F[CF(CF_3)CF_2O]_9CF(CF_3)CO_2CH_2CH_2(OCH_2CH_2)_6OCH_3$ in an apparatus similar to that of Example 1. Polyester doubleknit fabric (0.4 g.) was added and the system was heated, with agitation, to 104°C.; during the heating period the methyl ethyl ketone distilled off. Heating was continued at 104°C. for 3 hours. The fabric was then rinsed with trichlorotrifluoroethane, scoured with acetone at room temperature and dried, giving fabric with a fair to moderate violet dyeing.

EXAMPLE 12

A 200 ml. pressure vessel was charged with a mixture of 10.34 mg. of

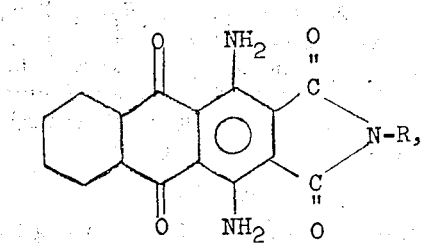

R being a mixture of $-C_2H_4OH$, $-(CH_2)_3OCH_3$ and $-(CH_2)_3OCH(CH_3)_2$, 20 ml. of methylene chloride, 140 ml. of perfluoro(dimethylcyclobutane) and 49.4 mg. of the surfactant $F[CF(CF_3)CF_2O]_9CF(CF_3)CO_2CH_2CH_2(OCH_2CH_2)_6OCH_3$. A 4.92 g. piece of polyester double-knit fabric was introduced, attached to a long stirring rod, the rod passing through an oil-sealed stirrer bearing in the top of the vessel; the vessel was also equipped with a distillation head. The dyebath was heated, with agitation; distillate was collected from 26° to 44°C.; the vessel was then sealed and heated to 140°C. for 60 min. On discharge, the fabric was strongly and uniformly dyed and the dyebath was colorless, indicating excellent exhaust. Scouring the fabric with acetone removed only a slight trace of color.

EXAMPLE 13

A solution of 0.4 mg. of the dye of Example 1 in 4 ml. of ethyl acetate was added to 24 ml. of perfluoro(N-propylmorpholine) containing 4 mg. of perfluorooctanoic acid; the mixture was introduced into an apparatus similar to that of Example 1, along with 0.41 g. of polyester double-knit fabric. The mixture was heated to 100°C.; during the heating period the ethyle acetate distilled; heating was continued for 2 hours at 100°C. Exhaust from the dyebath was excellent. The dyed fabric was rinsed with trichlorotrifluoroethane, then scoured with acetone at room temperature and dried. Considerable dye was removed, indicating the need for a higher dyeing temperatue, The dyeing was level but weak.

EXAMPLE 14

A solution of 10 mg. of the dye

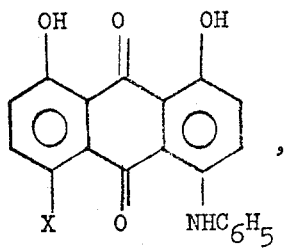

X being a mixture of —$NO_2$ and —$NHC_6H_5$, in 15 ml. of acetic acid was added to 95 ml. of $F[CF(CF_3)CF_2O]_yCHFCF_3$, y being 6.5 average, containing 25 mg. of the surfactant $F[CF(CF_3)CF_2O]_9CF(CF_3)CO_2CH_2CH_2(OCH_2CH_2)_6OCH_3$. The dye dispersion and 1.0 g. of polyester double-knit fabric were placed in the apparatus of Example 1. The mixture was heated, with agitation; distillate was collected until the temperature reached 150°C. Heating was continued at this temperature for 60 min.; exhaust from the dyebath was excellent. After rinsing the fabric in trichlorotrifluoroethane, scouring with acetone at room temperature and drying, the dyeing was found to be very strong.

EXAMPLE 15

Example 14 was repeated using 2 mg. of the dye of Example 4, 6 ml. of nitromethane, 20 ml. of a mixture of $C_{10}F_{21}Cl$, and $C_{12}f_{25}Cl$, b.p. 169°C., and 2 drops of the surfactant of Example 14. Distillation was continued until the temperature reached 165°C.; heating was continued at this temperature for 15 min.; the exhaust from the dyebath was excellent. After treating the fabric as in Example 14, a strong level dyeing was observed.

EXAMPLE 16

A solution of 5 mg. of the dye of Example 1 in 15 ml. of n-butyronitrile was added to a mixture of 95 ml. of $F[CF(CF_3)CF_2O]_3CHFCF_3$, 1 ml. of water and 25 mg. of the surfactant of Example 14. The resulting mixture was added to the apparatus of Example 1 containing 1.04 g. of polyester double-knit fabric. The mixture was heated, with agitation, and distillate was collected. The first distillate consisted of the nitrile/water azeotrope, b.p. 88°C. At 152°C., 30.8 ml. of distillate had been collected; heating at 152°C. was continued for 30 min. Exhaust from the dyebath was excellent. The fabric, after treating as in Example 14, indicated a strong dyeing.

EXAMPLE 17

Example 11 was repeated using 10 mg. of the dye of Example 9, 6 ml. of toluene, 20 ml. of $F[CF(CF_3)CF_2O]_nCF_2CF_3$, M.W. 5,500, 4 drops of $[RO]_aP(O)(OH)_{3-a}$, R being $C_{8-14}$ alkyl and a being 1.5 average, and 0.4 g. of cellulose acetate fabric. Heating, with agitation, was carried out to 135°C., at which temperature the toluene ceased to distill. Heating was continued at 133°–136°C. for 1 hour; the dyebath was colorless, indicating excellent exhaust. The fabric was rinsed with trichlorotrifluoroethane, scoured with aqueous detergent, rinsed with water and dried. The dyeing was level but weak.

EXAMPLE 18

Example 11 was repeated using 1 mg. of the dye of Example 6, 5 ml. of benzene, 20 ml. of $F[CF(CF_3)CF_2O]_3CHFCF_3$, 0.1 ml. of water, 0.1 g. of "Acryloid" 966, a commercially available surfactant, and 0.4 g. of cellulose triacetate fabric. The mixture was heated with stirring to 120°C.; the benzene-water azeotrope distilled from the mixture. Heating was continued at 120°C. for 1 hour; exhaust from the dyebath was excellent. The fabric, after treating as in Example 17, indicated strong dyeing.

I claim:

1. Exhaust dyeing process providing a high degree of exhaust and fixation and wherein disperse dyes are applied to and fixed in disperse dyeable synthetic polymers in the form of films, fibers or fabrics, said process comprising:

a. admixing an organic disperse dye, a suitable organic solvent and a saturated liquid fluorocarbon having a fluorine to carbon atom ratio of at least one, a solubility parameter of less than 7.0 and a critical temperature of at least 135°C., said organic solvent having a boiling point less than the boiling point of the liquid fluorocarbon;

b. contacting the disperse dyeable synthetic polymer with the mixture from (a); and c. heating to evaporate the organic solvent, and then continuing heating at a temperature greater than the glass transition temperature of the synthetic polymer to fix the dye in the polymer.

2. Process of claim 1 wherein the dye is dissolved in the organic solvent before admixing the liquid fluorocarbon, therewith.

3. The process of claim 1 wherein step (a) provides a solution of dye, organic solvent and liquid fluorocarbon.

4. The process of claim 1 wherein step (a) provides an emulsion of dye solution in liquid fluorocarbon.

5. The process of claim 4 wherein the emulsion contains an emulsifying agent.

6. The process of claim 5 wherein the emulsifying agent is $F[CF(CF_3)CF_2O]_9CF(CF_3)CO_2CH_2CH_2(OCH_2CH_2)_6OCH_3$.

7. The process of claim 1 wherein organic solvent is methylene chloride and the saturated liquid fluorocarbon is $F[CF(CF_3)CF_2O]_3CHFCF_3$.

8. The process of claim 1 whrein the disperse dyeable synthetic polymer is polyethylene terephthalate and heating is carried out at a temperature of at least 125°C.

9. Process of claim 1 wherein the organic solvent and liquid fluorocarbon are admixed before admixing the dye therewith.

10. Process of claim 1 wherein a mixture of the dye and organic solvent is admixed with a mixture of the organic solvent and liquid fluorocarbon.

11. Process of claim 1 wherein the organic solvent is an azeotrope of the solvent and the fluorocarbon.

* * * * *